United States Patent [19]

Ishihara et al.

[11] Patent Number: 5,774,046
[45] Date of Patent: Jun. 30, 1998

[54] POWER WINDOW APPARATUS WITH SENSOR FAILURE DETECTION

[75] Inventors: Hidenori Ishihara, Hamamatsu; Tsutomu Saito; Takeshi Tanaka, both of Toyohashi; Tomoyuki Kikuta, Toyohashi; Noboru Tsuge, Kariya, all of Japan

[73] Assignee: Asmo Co., Ltd., Kosai, Japan

[21] Appl. No.: 863,526

[22] Filed: May 27, 1997

[30] Foreign Application Priority Data

| Jun. 13, 1996 | [JP] | Japan | 8-152717 |
| Jun. 13, 1996 | [JP] | Japan | 8-152718 |
| Apr. 7, 1997 | [JP] | Japan | 9-088285 |
| Apr. 7, 1997 | [JP] | Japan | 9-088286 |

[51] Int. Cl.$^6$ .................................................. B60J 1/08
[52] U.S. Cl. .................... 340/438; 340/545; 318/257; 318/266; 318/434; 318/469; 49/26; 49/28
[58] Field of Search ..................... 340/438, 540, 340/545; 318/256, 257, 264–268, 434, 466, 468, 469; 49/26, 28

[56] References Cited

U.S. PATENT DOCUMENTS

| 5,187,381 | 2/1993 | Iwasa et al. | 340/438 |
| 5,404,673 | 4/1995 | Takeda et al. | 49/28 |
| 5,459,962 | 10/1995 | Bonne et al. | 49/28 |
| 5,483,135 | 1/1996 | Parks | 318/469 |
| 5,621,290 | 4/1997 | Heller et al. | 318/466 |
| 5,661,385 | 8/1997 | McEwon | 340/552 |

FOREIGN PATENT DOCUMENTS

| 7-4137 | 1/1995 | Japan. |
| 7-96740 | 4/1995 | Japan. |

Primary Examiner—Edward Lefkowitz
Attorney, Agent, or Firm—Burns, Doane, Swecker & Mathis, LLP

[57] ABSTRACT

In a power window apparatus, an external force which develops at the time of catching foreign objects in a window is detected directly by a window frame sensor and indirectly by a motor load detection circuit. Automatic window closing operation is disabled when the external force exceeds a first and a second predetermined levels of the window frame sensor and the motor load detection circuit, respectively. When the window frame sensor fails, the window closing operation is disabled and a warning is provided at the time the external force detected by the load detection circuit reaches a third predetermined level. Alternatively, the automatic window closing operation is disabled when the external force exceeds the first or the second predetermined levels of the window frame sensor or the motor load detection circuit, respectively. When the window frame sensor fails, the window closing operation is disabled and the warning is provided at the time the external force reaches the second predetermined level. In each case, once the window frame sensor fails, the predetermined level used to determine a failure of the window frame sensor may be lowered so that the window closing operation may be disabled earlier.

12 Claims, 4 Drawing Sheets

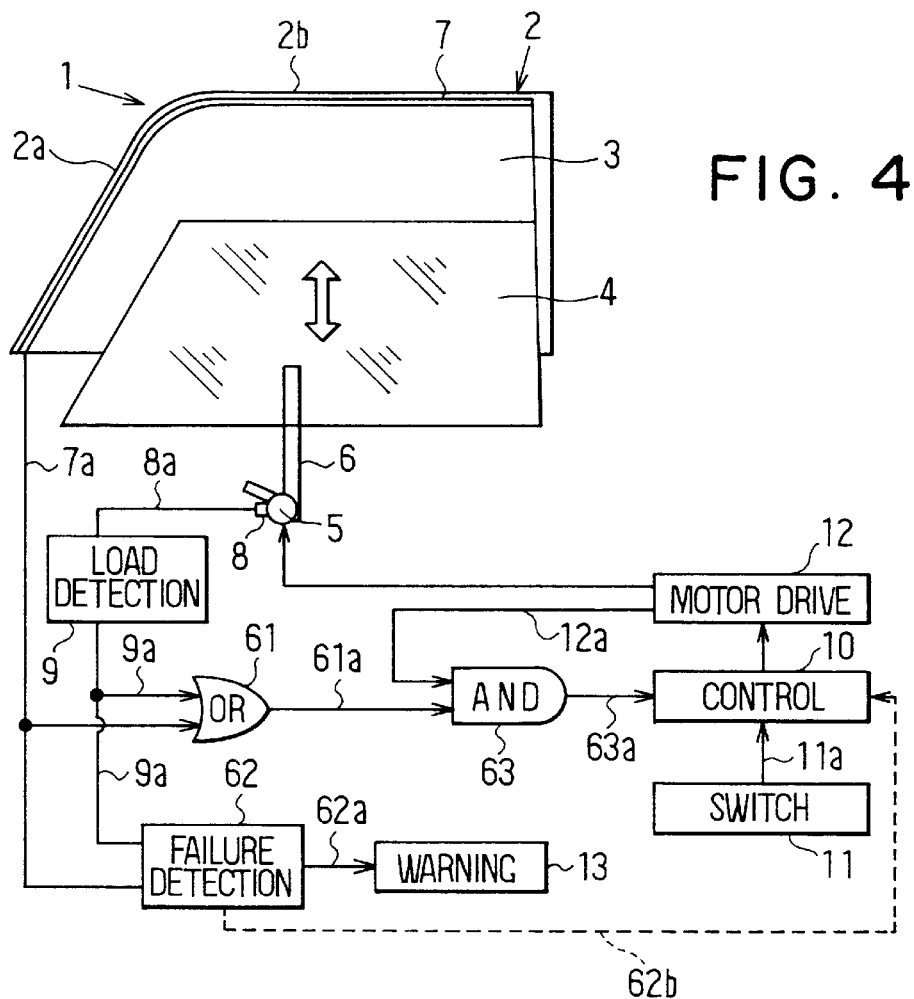

POWER WINDOW APPARATUS WITH SENSOR FAILURE DETECTION

CROSS REFERENCE TO RELATED APPLICATION

This application is based on and claims priorities of Japanese patent applications No. 8-152717 filed on Jun. 13, 1996, No. 8-152718 filed on Jun. 13, 1996, No. 9-88285 filed on Apr. 7, 1997 and No. 9-88286 filed on Apr. 7, 1997, the contents of which are incorporated herein by reference.

BACKGROUND OF THE INVENTION

1. Field of the Invention

The present invention relates to a power window apparatus and, more particularly, to a power window apparatus which is used in a vehicle to prevent catching of foreign objects in a door window.

2. Description of Related Art

In a vehicle equipped with a power window apparatus, it may occur that foreign objects such as fingers are accidentally caught between a window frame and a window glass of a vehicle door during automatic window closing operation.

To counter this accidental catching, JP-A 7-4137 proposes to control a window electrically by the use of a controller together with an external force detector such as a cord switch disposed along a window frame for directly detecting an external force applied thereto and a current detector for detecting electric current (motor current) supplied to a window-driving motor thereby to detect indirectly the external force. More specifically, when both the external force detector and the current detector detect external force and motor current exceeding respective predetermined levels, the controller disables window closing operation determining that a foreign object is caught between the window frame and the window glass.

The cord switch used as the external force detector may be a type in which, as proposed by JP-A 7-96740, a pair of electrically conductive members are disposed to face each other with rubber elastic pieces therebetween for electrical insulation by spacings. As the external force exerting on the cord switch increases, the elastic pieces deform gradually and the conductive members conducts electrically to generates a signal when the external force reaches the predetermined level.

Provided that the cord switch becomes inoperative due to changes in elasticity of the elastic pieces or development of insulating oxide films over the conductive members, catching prevention cannot be ensured.

SUMMARY OF THE INVENTION

It is therefore an object of the present invention to provide a power window apparatus which ensures catching prevention even upon failure of an external force sensor.

According to a first aspect of the present invention, a window closing operation is disabled in both occasions that an external force exceeds a first and a second predetermined levels of two external force detecting means, respectively, and that the external force exceeds a third predetermined level which is higher than the first and the second predetermined levels. Preferably, one detecting means having the first predetermined level is attached to a window frame to detect the external force directly and the other detecting means having the second and the third predetermined levels detects the external force indirectly. When the one detecting means fails to detect catching of foreign objects, the other detecting means detects it when the external force exceeds the third predetermined level. A warning of the failure may be provided at this time. With the other detecting means having two predetermined levels for external force detection, no additional sensors or circuits are necessitated to compensate for the failure of the one detecting means. More preferably, the third predetermined level is lowered when the failure of the one detector occurs.

According to a second aspect of the present invention, a window closing operation is disabled in at least one of occasions that an external force detected by one detecting means exceeds a first predetermined level and that the external force detected by the other detecting means exceeds a second predetermined level. When the one detecting means fails, the other detecting means disables the window opening operation and provides a warning at the time the detected external force reaches the second predetermined level. Preferably, the one detecting means having the first predetermined level is attached to a window frame to detect the external force directly and the other detecting means having the second predetermined level detects the external force indirectly. More preferably, the second predetermined level is lowered when the failure of the one detector occurs. Alternatively, the failure of the first detecting means may be determined by the use of another predetermined level higher than the second predetermined level, and the another predetermined level may be lowered below the second predetermined level upon determination of the failure.

BRIEF DESCRIPTION OF THE DRAWINGS

Other objects, features and advantages of the present invention will become more apparent from the following detailed description when read with reference to the accompanying drawings, in which:

FIG. 4 is an electric wiring diagram showing a power window apparatus according to a second embodiment of the present invention;

FIG. 5 is a table showing combinations of detector output signals for use in failure determination.

DETAILED DESCRIPTION OF PRESENTLY PREFERRED EMBODIMENT

Figure 1:
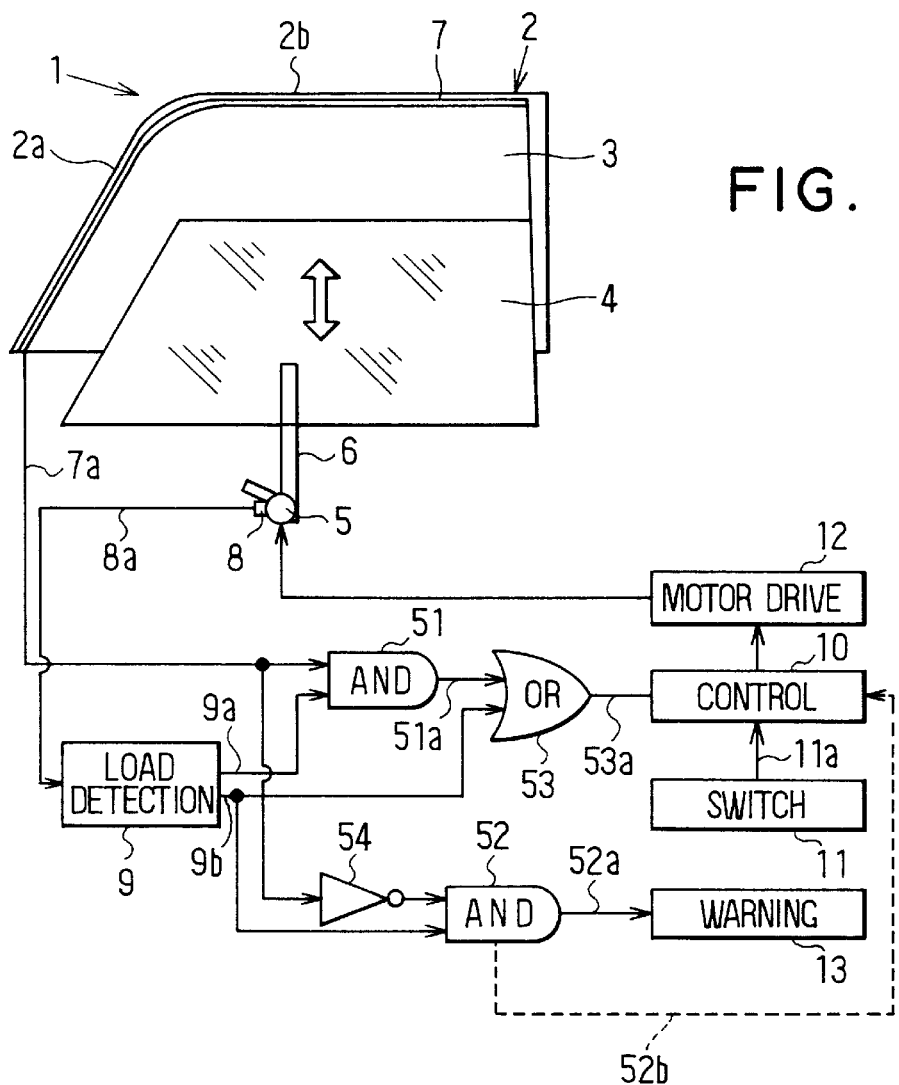
FIG. 1 is an electric wiring diagram showing a power window apparatus according to a first embodiment of the present invention.

Various embodiments and modifications will be described more fully with reference to the drawings in which the same reference numerals are used to designate the same or similar construction throughout the embodiments and modifications.

(First Embodiment)

A power window apparatus is applied to a vehicle which has, as shown in FIG. 1, a vehicle door 1 and a window frame 2 defining a window opening 3. The vehicle door 1 is equipped with a window glass 4 movable elevationally within the window opening 3 and a drive motor 5 linked with a regulator 6 for driving the window glass 4 upward and downward.

A window frame sensor 7 as a direct external force detector is disposed along a front side 2a and a top side 2b of the window frame 2 for sensing directly an external force which will exert on the window frame 2. The sensor 7 connects to an AND gate 51 and an inverter 54. The sensor 7 may be the known type in which electrically conductive rubber members are disposed longitudinally on the opposing inner peripheral faces of an electrically insulating elastic rubber tube. The sensor 7 is so constructed to produce a high level signal 7a when an external force exerting thereon reaches or exceeds a first predetermined level (N1=10N in FIG. 2) at which the rubber tube deforms and causes the opposing conductive members to contact each other.

The drive motor 5 is equipped with a rotation sensor 8 which senses rotational speeds of the drive motor 5 and applies a signal 8a indicative of the rotation speed to a load detection circuit 9. The circuit 9 is so constructed to detect loads on the drive motor 5 based on changes in the motor rotation speeds and apply a high level signal 9a to the AND gate 52 when the detected load reaches or exceeds a second predetermined level N2 which corresponds to an external force (50N in FIG. 2) higher than the first predetermined level N1 detected by the sensor 7. The circuit 9 is so constructed further to apply a high level signal 9b to an OR gate 53 when the detected load reaches or exceeds a third predetermined level N3 which corresponds to an external force (100N in FIG. 2) higher than the second predetermined level N2. Thus, this embodiment has two external force detecting mechanisms, one being the window frame sensor 7 and the other being the rotation sensor 8 and the load detection circuit 9.

The AND gate 51 which produces a signal 51a connects to the OR gate 53 which produces a signal 53a and connects to a control circuit 10. The control circuit 10 is so constructed to control a motor drive circuit 12 in response to the signal 53a and a signal 11a from a manual switch 11 which commands upward/downward movement of the window glass 4. The motor drive circuit 12 receives electric power from a battery (not shown) to drive the motor 5 and switches over polarity of a d.c. voltage applied to the drive motor 5 so that the motor rotating direction is reversed. The inverter 54 connects to the AND gate 52 which in turn connects to a warning device 13 to provide a warning light or the like warning in response to a signal 52a.

The first embodiment operates as follows.
(A) In case of no failure in window frame sensor 7

Figure 2:
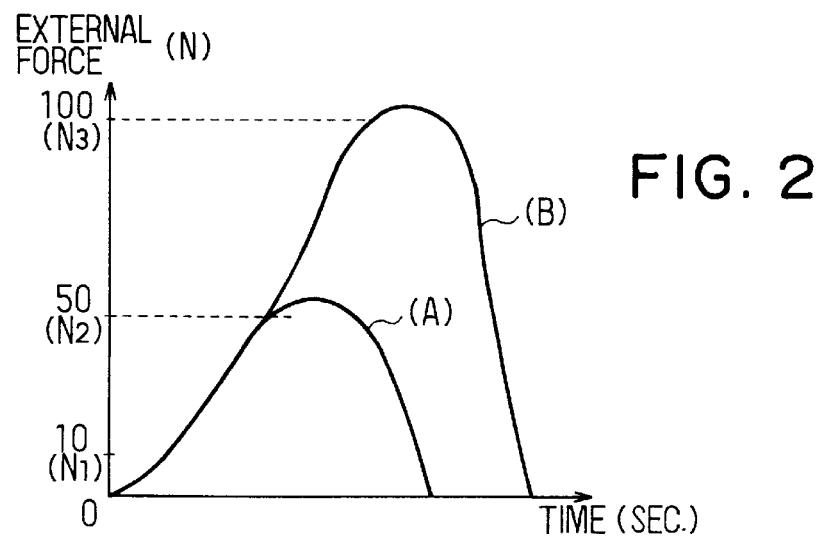
FIG. 2 is a graph showing a relation between external force (load on a drive motor) and time.

When a foreign object is caught during window closing operation, the external force exerting on the window frame sensor 7 increases as shown in FIG. 2. With the external force reaching or exceeding the first predetermined level N1 and then the second predetermined level N2, the AND gate 51 receiving the high level signals 7a and 9a produces the high level signal 51a which in turn is applied to the control circuit 10 as the high level signal 53a through the OR gate 53. The control circuit 10 thus operates in the known manner to reverse the rotating direction of drive motor 5 via the motor drive circuit 12. Thus, the window glass 4 changes its moving direction from upward to downward resulting in the decrease of external force as shown by a curve (A) in FIG. 2.
(B) In case of failure in window frame sensor 7

Even when a certain foreign object is caught between the window frame 2 and the window glass 4 during window closing operation, the window frame sensor 7 does not produce the high level signal 7a and the AND gate does not produce the high level signal 51a which reverses the motor rotation. The window glass 4 continues to move upward, so that the external force exerting on the window frame sensor 7 increases above the second predetermined level N2 as shown by a curve (B) in FIG. 2. However, when the external force reaches or exceeds the third predetermined level N3 higher than the second predetermined level N2, the load detection circuit 9 produces the high level signal 9b with which the OR gate 53 produces the high level signal 53a. As a result, the control circuit 10 operates to reverse the motor rotation for opening the window glass 4 so that the window glass 4 moves downward to decrease the external force. With the high level signal 9b, the AND gate 52 drives the warning device 13 by the high level signal 52a so that the failure of the window frame sensor 7 is informed to a vehicle passenger.

It is to be noted in the first embodiment that the load on the drive motor 5 changes normally due to friction between the window frame 2 and the window glass 4 sliding therein. Provided that the second predetermined level N2 set to detect catching of foreign objects is within a range of such normal load changes, catching of foreign objects cannot be determined correctly unless motor load changes due to sliding movement of the window glass 4 is eliminated by a filter circuit or the like. According to the first embodiment, however, the first predetermined level N1 is set to be lower than the second predetermined level N2, catching of foreign object is detected primarily by the window frame sensor 7. Thus, the second predetermined level can be set higher than the range of motor load changes. Thus, the motor load changes need not be compensated by the filter circuit or the like.

(Modification of First Embodiment)

In a modification of the first embodiment, the third predetermined level N2 is decreased as the number (n) of occurrences that the detected motor load exceeds the third predetermined level N3 increase. For instance, the third predetermined level N3 may be decreased from the level N3 normally used to a new modified level N3' when the number (n) reaches a predetermined value n'.

Figure 3:
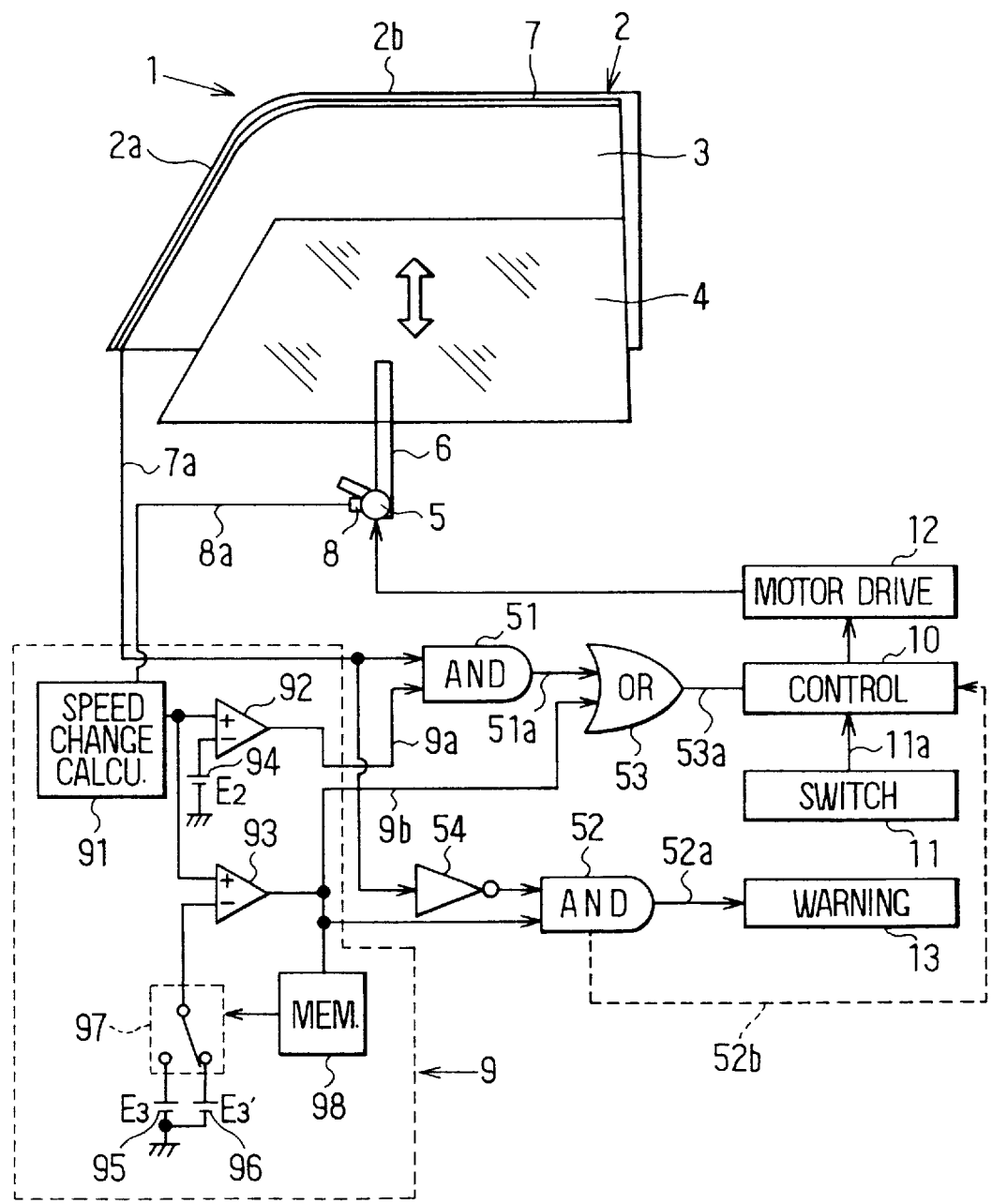
FIG. 3 is an electric wiring diagram showing a power window apparatus according to a modification of the first embodiment shown in FIG. 1.

The load detection circuit 9 is constructed as shown in FIG. 3 for this function. In the circuit 9, a speed change calculation circuit 91 is provided to calculate changes in the motor rotation speeds detected by the rotation sensor 8a, a comparator 92 is provided to compare the calculation output (motor load) of the calculation circuit 91 with a reference E2 which corresponds to the second predetermined level N2 and is provided by a reference voltage source 94.

In addition, a second comparator 93 is provided to compare the calculation output of the calculation circuit 91 with a reference E3 which corresponds to the third predetermined level N3 or a modified reference E3' which corresponds to the modified level N3' which is lower than the third predetermined level N3. Preferably, the modified level N3' is set lower than both third and second predetermined levels N3 and N2 so that the loading on the foreign object will be reduced as much as possible. The references E3 and E3' are provided by reference voltage sources 95 and 96, respectively, to be selected by a selection switch 97. A memory circuit 98 is provided to count and store the number of times the calculation output of the calculation circuit 91 reaches the reference E3. In case of n'=1, the memory circuit 98 may be a flip-flop which switches over two switching positions of the selection switch 97.

The selection circuit 97 normally applies the reference E3 to the comparator 93 so that the same operation as in the first embodiment may be performed. When the calculation output of the calculation circuit 91 exceeds the reference E3 causing the comparator 93 to produce the high level signal, however, the memory circuit 98 responsively causes the selection switch 97 to apply the modified reference E3' so that the catching prevention may be performed earlier in the case that the failure of the window frame sensor 7 has been already detected.

(Second Embodiment)

In this embodiment, the window frame sensor 7 connects to an OR gate 61 and a failure determination circuit 62. The load detection circuit 9 connects to the OR gate 61 and the failure detection circuit 62. The sensor 7 produces the high level signal 7a when the external force exerting thereto reaches or exceeds the first predetermined level (N1=10N), while the load detection circuit 9 produces the high level signal 9a when the external force reaches or exceeds the second predetermined level (N2=50N). Therefore, the catching of foreign objects is determined when at least one of the high level signals 7a and 9a is produced.

The OR gate 61 connects to an AND gate 63 which connects to the control circuit 10. The AND gate 63 produces a signal 63a which causes the control circuit 10 to reverse the rotation direction of the motor 5, when a high level signal 61a of the OR gate 61 indicative of catching of foreign objects and a high level signal 12a of the motor drive circuit 12 indicative of window closing operation are produced concurrently.

The failure determination circuit 62 which activates the warning device 13 by a high level signal 62a is so constructed to detect failure of the window frame sensor 7 in response to not only the signal 8a from the rotation sensor 8 but also the signal 7a from the window frame sensor 7.

With the first predetermined level N1 being set lower than the second predetermined level N2, as long as the sensor 7 operates properly, the motor rotation is reversed in response to the high level signal 7a when any foreign matters are caught between the window frame 2 and the window glass 4 moving upward. In this instance, the load detection circuit 9a does not produce the high level signal 9a. However, provided that the window frame sensor 7 fails to operate properly, the window glass 4 continues to move upward even when the external force reaches the first predetermined level N1. In this instance, at the time the external force reaches or exceeds the second predetermined level N2, the load detection circuit 9 produces the high level signal 9a which in turn causes the motor 5 to reverse its rotation direction.

The failure detection circuit 62 is constructed to produce the high level signal 62a for warning in response to the presence (ON) of the high level signal 9a under the absence (OFF) of the high level signal 7a. This is shown in FIG. 5 in which a circle-mark and cross-mark indicate the absence and the presence of the failure in the window frame sensor 7.

(Modification of Second Embodiment)

In the same manner as in the modification of the first embodiment, the second embodiment may be so modified that the second predetermined level N2 is decreased to the modified level N2' as the number (n) of occurrences that the external force reaches or exceeds the second predetermined level N2 reaches the predetermined number (n'=1).

Figure 6:
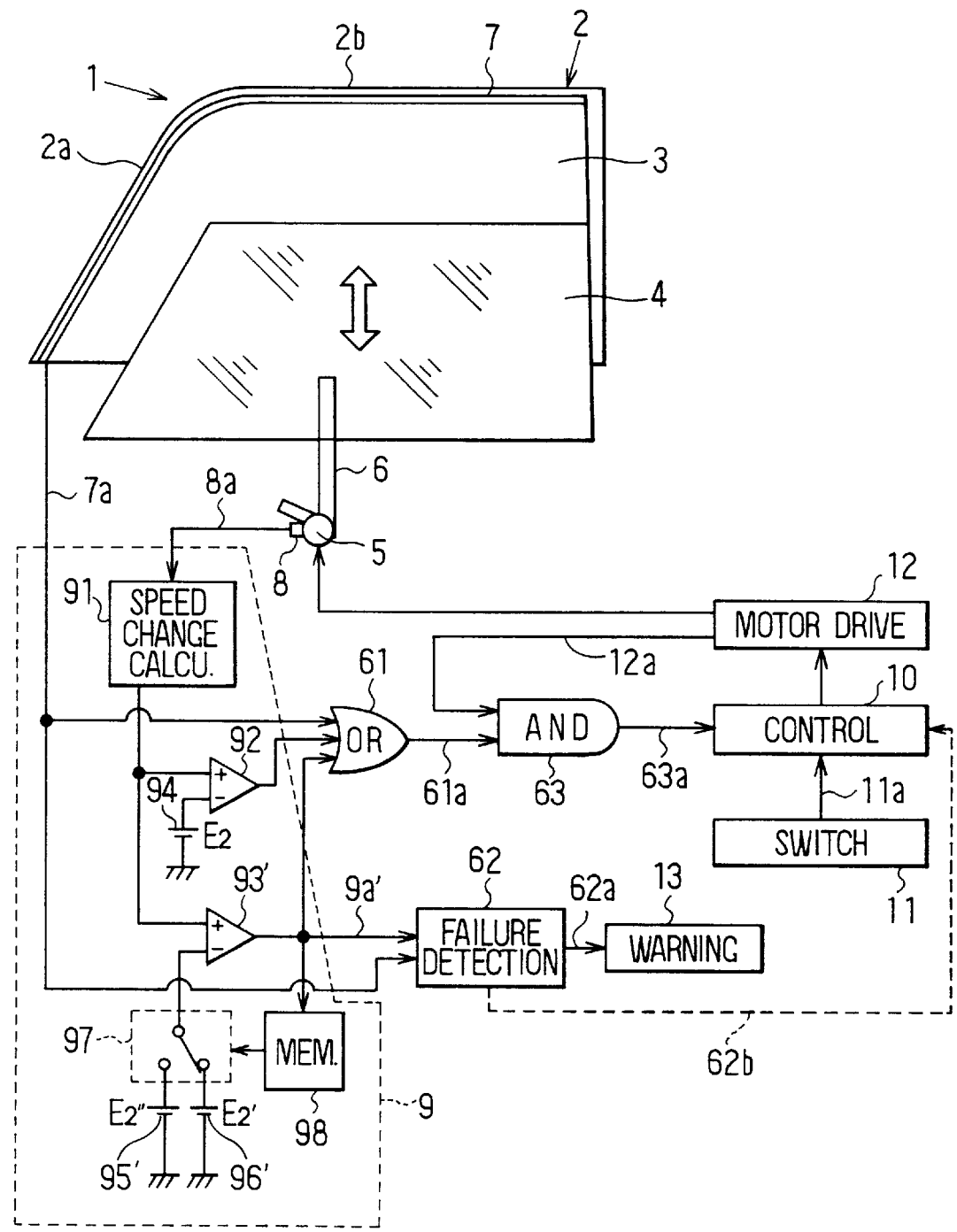
FIG. 6 is an electric wiring diagram showing a power window apparatus according to a modification of the second embodiment shown in FIG. 4.

It is also possible to determine occurrence of failure in the window frame sensor 7 by the use of another predetermined level which is different from the second predetermined level N2. In this case, as shown in FIG. 6, a comparator 93' is provided to compare normally the calculation output (motor load) with a reference E2" provided by a voltage source) 5' and higher than the reference E2 of the comparator 92. A high level signal 9a' of the comparator 93' is produced at a predetermined level (60N–70N) higher than the second predetermined level N2 (50N) and applied to the OR gate 61 in addition to the high level signal 9a from the comparator 92. With the high level signal 9a' being applied also to the memory circuit 98, the reference voltage applied to the comparator 93' is switched to E2' by the memory circuit 98 and the selection switch 97. The reference E2' is provided by a voltage source 96' and set to correspond to a level (40N) lower than the second predetermined level N2 (50N). Thus, the failure determination threshold is lowered once the failure has been determined.

The above first and second embodiments and the modifications may be further modified without departing from the spirit and scope of the invention. For instance, the motor load may be detected by a motor current in place of the motor rotation speed. Further, by the use of a signal 52b (FIGS. 1 and 3) or 62b (FIGS. 4 and 6), an automatic window closing operation may be disabled once the failure of the window frame sensor is detected, or automatic power window operation of vehicle doors other than the door in which the failure of the window frame sensor is detected may be disabled.

What is claimed is:

1. A power window apparatus for a vehicle, comprising:
   a movable body disposed movably in an opening defined by a window frame;
   driving means for moving the movable body to open and close the opening;
   sensing means for sensing external force exerting on the window frame;
   detecting means for detecting, separately from the sensing means, the external force exerting on the movable body;
   first disabling means for disabling the movable body to move to close the opening when the sensed external force reaches a first predetermined level and the detected external force reaches a second predetermined level; and
   second disabling means for disabling the movable body to move to close the opening when the detected external force reaches a third predetermined level, the third predetermined level being larger than the first and the second predetermined levels.

2. The power window apparatus according to claim 1, further comprising:
   warning means for warning a failure of the sensing means in response to a presence of disabling operation by the second disabling means under an absence of disabling operation by the first disabling means.

3. The power window apparatus according to claim 1, wherein said detected external force reaches the third predetermined level a number of occurrences, further comprising:
   changing means for lowering the third predetermined level when the number of occurrences reaches a predetermined value.

4. The power window apparatus according to claim 3, wherein:
   the changing means lowers the third predetermined level to a level lower than the second predetermined level.

5. The power window apparatus according to claim 1, wherein:

the sensing means is attached to the window frame to be directly responsive to the external force; and the detecting means is connected to the drive means to be indirectly responsive to the external force.

6. A power window apparatus for a vehicle, comprising:

a movable body disposed movably in an opening defined by a window frame;

driving means for moving the movable body to open and close the opening;

sensing means for sensing external force exterting on the window frame;

detecting means for detecting, separately from the sensing means, the external force exerting on the movable body;

disabling means for disabling the movable body to move to close the opening in at least one of the cases when the sensed external force reaches a first predetermined level and when the detected external force reaches a second predetermined level;

failure determining means for determining a failure of the sensing means when the detected external force reaches the second predetermined level with the sensed external force remaining below the first predetermined level; and warning means for providing a warning in response to a determination of the failure by the failure determining means.

7. The power window apparatus according to claim 6, wherein:

the first predetermined level is set lower than the second predetermined level.

8. The power window apparatus according to claim 6, wherein said detected external force reaches the second predetermined level a number of occurrences, further comprising:

changing means for lowering the second predetermined level when the number of occurrences reaches a predetermined value.

9. The power window apparatus according to claim 6, wherein:

the sensing means is attached to the window frame to be directly responsive to the external force; and the detecting means is connected to the drive means to be indirectly responsive to the external force.

10. A power window apparatus for a vehicle, comprising:

a movable body disposed movably in an opening defined by a window frame;

driving means for moving the movable body to open and close the opening;

sensing means for sensing external force exterting on the window frame;

detecting means for detecting, separately from the sensing means, the external force exerting on the movable body;

disabling means for disabling the movable body to move to close the opening in at least one of the cases when the sensed external force reaches a first predetermined level and when the detected external force reaches a second predetermined level;

failure determining means for determining a failure of the sensing means when the detected external force reaches another predetermined level with the sensed external force remaining below the first predetermined level, the another predetermined level being higher than the second predetermined level; and warning means for providing a warning in response to a determination of the failure by the failure determining means.

11. The power window apparatus according to claim 10, wherein said detected external force reaches the second predetermined level a number of occurrences, further comprising:

changing means for lowering the another predetermined level below the second predetermined level when the number of occurrences reaches a predetermined value.

12. The power window apparatus according to claim 10, wherein:

the sensing means is attached to the window frame to be directly responsive to the external force;

the detecting means is connected to the drive means to be indirectly responsive to the external force; and the first predetermined level is set lower than the second predetermined level.

* * * * *